Jan. 15, 1952 — T. C. LEAKE — 2,582,637
FUEL INJECTOR FOR STARTING INTERNAL-COMBUSTION ENGINES
Filed April 11, 1950 — 3 Sheets-Sheet 1
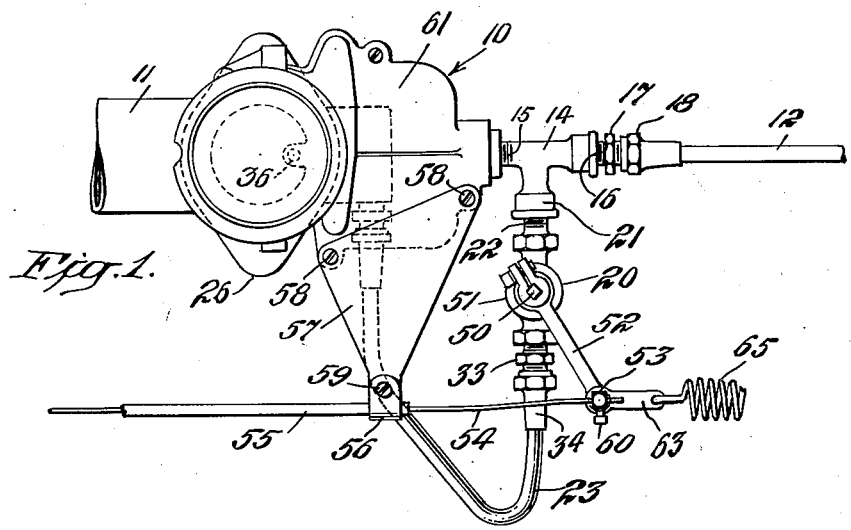
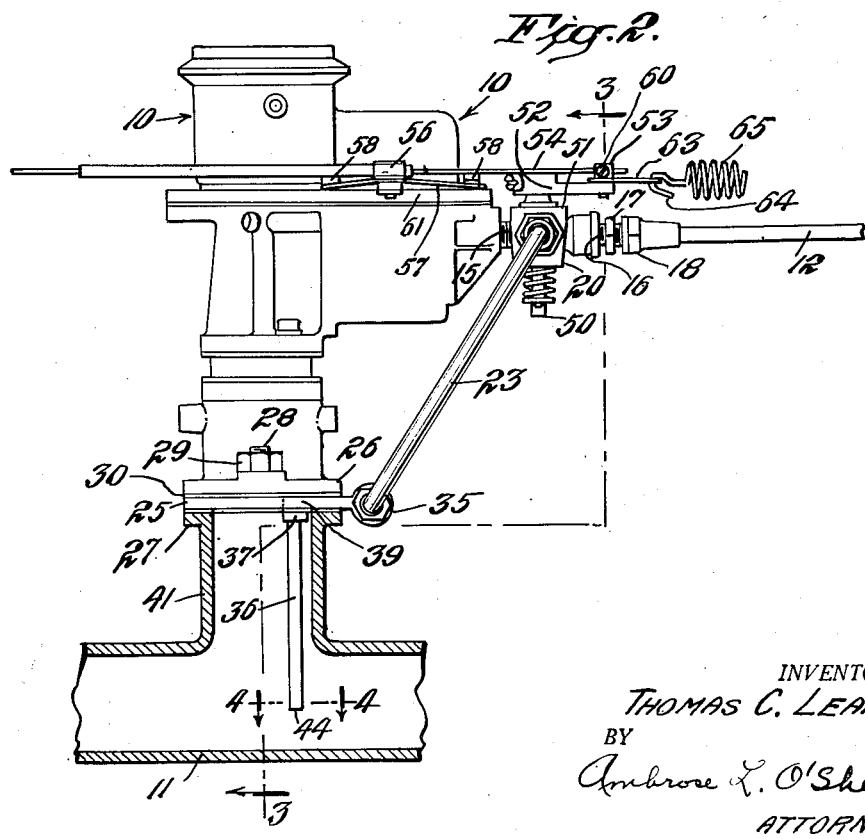
INVENTOR.
THOMAS C. LEAKE
BY
Ambrose L. O'Shea
ATTORNEY Jan. 15, 1952            T. C. LEAKE            2,582,637
FUEL INJECTOR FOR STARTING INTERNAL-COMBUSTION ENGINES
Filed April 11, 1950                         3 Sheets-Sheet 2
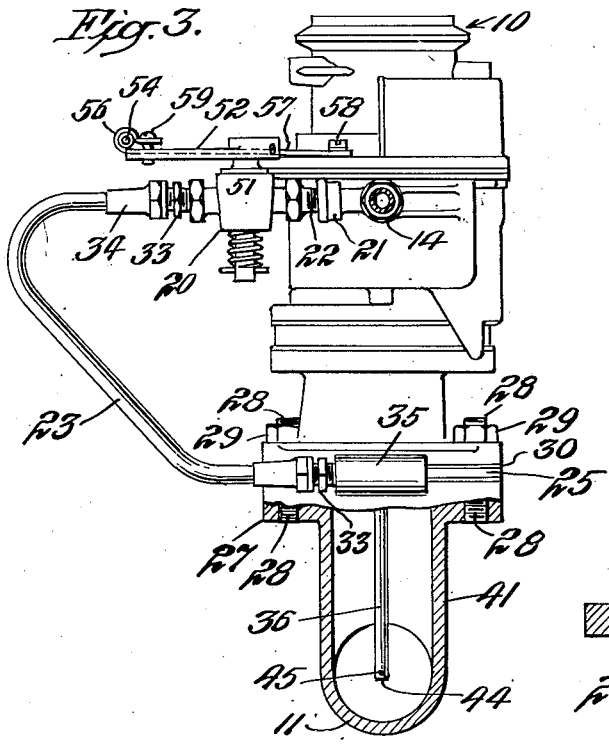
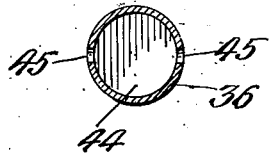
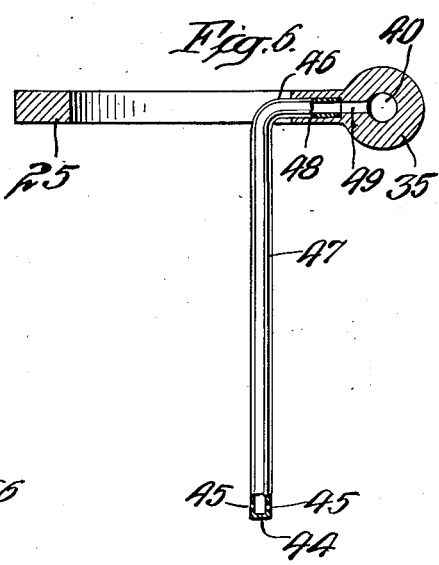
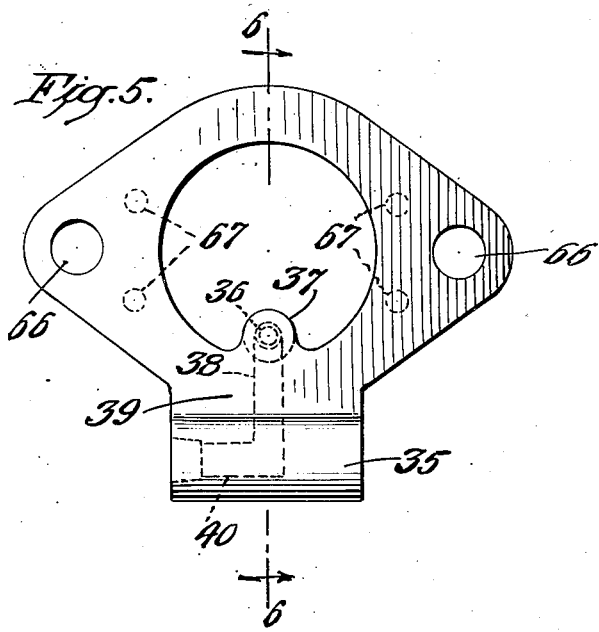
INVENTOR.
THOMAS C. LEAKE
BY
Ambrose L. O'Shea
ATTORNEY Jan. 15, 1952 T. C. LEAKE 2,582,637
FUEL INJECTOR FOR STARTING INTERNAL-COMBUSTION ENGINES
Filed April 11, 1950 3 Sheets-Sheet 3
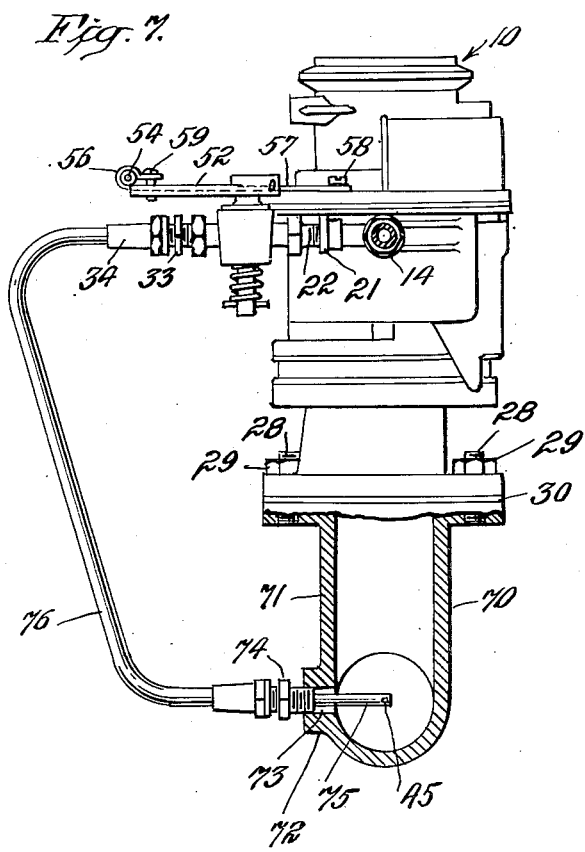
INVENTOR.
THOMAS C. LEAKE
BY
Ambrose L. O'Shea
ATTORNEY Patented Jan. 15, 1952

2,582,637

UNITED STATES PATENT OFFICE 2,582,637

FUEL INJECTOR FOR STARTING INTERNAL-COMBUSTION ENGINES

Thomas C. Leake, New York, N. Y.

Application April 11, 1950, Serial No. 155,325

10 Claims. (Cl. 123—180)

This invention relates to internal combustion engines used in motor vehicles, and particularly to engines in which the fuel-air mixture is supplied to the engine by means of a carbureter.

In cold weather, and under other severe starting conditions, it is often difficult to start an automobile engine, due to the difficulty in obtaining a sufficiently rich mixture of vaporized fuel and air to facilitate ignition and combustion when the engine is cold.

This results in repeated cranking of the engine by means of the electric starter, which rapidly drains the current from the battery, and further aggravates the starting problem.

After a period of cranking the engine, the liquid fuel tends to remain in the combustion chambers of the cylinders, thereby tending to foul the spark plugs, and leaving an excessive amount of unevaporated liquid fuel in the combustion chamber, which renders starting even more difficult, until the excess liquid fuel is cleared out.

While automatic chokes are provided in most modern vehicles, the thermostatic elements in them frequently get out of order, and become corroded in such a manner as to sharply reduce their effectiveness, in providing a rich starting mixture.

The object of my invention is to provide a manually controlled device, which will inject a spray of finely divided liquid fuel into the manifold, to facilitate starting the engine.

A further object is to provide an auxiliary fuel injection device which can be installed in the conventional type of motor vehicle without machine work, or removing any of the major parts of the engine or the carbureter, or interfering with the carbureter adjustment, in the process of installation.

A further object is to provide an injection device which will function only when desired, and will allow the normal carburetion system to function, after the engine is started.

A primary object is to provide a simple, positive, manually controlled device, which may be fitted into the fuel feed line to the carbureter and can be installed and operated by persons without special skills or experience.

The accompanying drawings, illustrative of one embodiment of my invention, together with the description of its construction and the method installation and operation thereof, will serve to clarify further objects and advantages of my invention.

In the drawings:

Fig. 1 represents a plan view of the carbureter and fuel line, with the injection control valve and the actuating mechanism therefor, in place.

Fig. 2 is a front elevation of a portion of the carbureter and the fuel injection mechanism, and a vertical section through the intake pipe section of the intake manifold.

Fig. 3 is a side elevation of the assembled unit of Figs. 1 and 2, and a cross-section through the intake pipe section of the intake manifold, taken at 3—3, Fig. 2.

Fig. 4 is a cross-section through the fuel injector tube of Fig. 2, taken at 4—4, Fig. 2.

Fig. 5 is a plan view of one embodiment of the insert flange mounted between the carbureter and the intake manifold of Figs. 2 and 3, to support the fuel feed tube coupling, and the injector tube.

Fig. 6 is a section through one side and the boss of a modified form of insert flange, taken at 6—6, Fig. 5.

Fig. 7 is a side elevation of a modification of the assembled unit of Fig. 3, and a cross section through the intake pipe section of a modification of the intake manifold, similar to Fig. 3.

It will be understood that the following description of the construction and operation of the fuel injector for starting internal combustion engines, is intended as explanatory of the invention and not restrictive thereof.

In the drawings, the same reference numerals designate the same parts throughout the various views, except where otherwise indicated.

Figs. 1, 2 and 3, show the carburetion system of the conventional type of motor vehicle internal combustion engine, comprising a carbureter 10, which feeds a mixture of fuel and air through an intake manifold 11 to the cylinders, the liquid fuel being supplied to the carbureter from the fuel tank by a tubular fuel line 12, with a starting fuel injection attachment added thereto.

In the construction shown in Figs. 1, 2 and 3, a T 14 is threadedly inserted into the carbureter fuel line opening, by means of pipe threads 15, formed at one end thereof, the opposite end of the T threadably receiving the tapered pipe or other suitable form of threads 16, formed at one end of an adapter 17, the opposite end of which fits into a tube coupling nut 18, the flared end of the tube being gripped between the coupling nut and the adapter.

A tapered seat valve 20, or other suitable type of valve, may be threadably inserted into the perpendicular outlet 21 of the T, the threads 22, formed at the inlet end of the valve, fitting into a threaded opening formed in the T.

An auxiliary fuel tube 23 may be inserted between the valve 20, and an insert flange 25, mounted between the carbureter outlet flange 26, and the flange 27, formed integral with the intake manifold, the studs 28, which normally attach the intake manifold to the carbureter, supporting the insert flange 25, the nuts 29, mounted on the studs, clamping the insert flange between the carbureter, and the intake manifold flanges. Vellumoid, paper, or other suitable type of gaskets 30 may be inserted between the carbureter and manifold flanges, and the corresponding faces of the insert flange 25, to seal the carbureter openings.

A tube coupling adapter 33, may be inserted between the outlet end of the valve 20 and the tube coupling nut 34, supporting one end of the auxiliary fuel tube, to connect the valve to the auxiliary fuel tube.

At the opposite end of the auxiliary fuel tube 23, a similar adapter 33 may be threadably fitted into an opening formed in a boss 35, formed integral with or attached to the insert flange 25, the opposite end of the adapter threadably retaining the coupling nut 34, thereby supporting the opposite end of the auxiliary fuel tube 23.

One or more injector tubes 36 may be soldered, brazed, or otherwise attached to an opening formed in a boss 37, attached to or formed integral with the insert flange 25, a substantially horizontal opening 38, formed in an inner extension 39, of the flange 25, which supports the boss 37, connecting the inlet opening 40 in the insert boss, Fig. 6, with the interior of the injector tube. The injector tube 36, which is formed of small diameter tubing, projects into the central or inlet pipe section 41 of the intake manifold.

The free or lower end 44 of the injector tube 36 may be plugged or sealed in other suitable manner, a plurality of nozzle openings 45 being formed in the walls of the injector tube, as indicated in Figs. 2 and 4, the nozzle openings being located in substantial alignment with the center of the manifold 11, thus injecting the fuel spray from the interior of the injector tube through the nozzle openings 45, into the stream which carries the mixture of air and suspended or vaporized fuel, fed from the carbureter, along the manifold passages, thence into the individual cylinders.

The finely dispersed fuel particles, injected through the nozzle openings, mix with the air-fuel stream, thereby supplying an enriched mixture of fuel and air into the cylinders, thus facilitating the starting of the engine.

In a modification of the injector tube construction shown in Fig. 6, the upper portion 46 of the injector tube, formed integral with and substantially perpendicular to the depending vertical section 47 of the injector tube proper, may be soldered, brazed, or otherwise attached to the walls of an opening 48, formed in the insert flange, an intermediate connecting opening 49, in substantial alignment with the opening 48, connecting the interior of the tube with the opening formed in the insert boss 35, thereby allowing the fuel to pass from the auxiliary fuel line, through the injector tube, to a plurality of nozzle openings 45, formed at the bottom, above the closed or sealed end of the injector tube, in the manner hereinbefore described.

The stem 50 of the frusto-conical or other suitable form of valve, seated in the valve housing 51, may be attached to one end of a control lever 52, as indicated in Figs. 1 and 2. A swivel 53 may be threadably or otherwise attached to the opposite end of the control lever 52, an opening, formed in the head of the swivel, receiving one end of a pull wire or cable 54, which connects the control lever 52, either directly or through an intermediate lever (not shown), to a pull knob (not shown), located on or adjacent the instrument board of the vehicle, thus enabling the operator to open the valve 20 by manually drawing the pull wire 54, thereby angularly moving the control lever 52.

A shield or flexible tube 55 may be fitted around the pull wire 54, the free end of the tube being supported by a folded clamp 56, formed integral with or attached to a sheet metal or other suitable form of bracket 57, which is mounted on the cover plate of the carbureter by a plurality of screws 58, or other suitable attaching means, depending upon the construction and contour of the body of the individual carburetor, a stove or other suitable type of bolt 59 and nut, clamping one end of the shield. A set screw 60, or other suitable type of screw, may be threadably fitted to the head of the swivel 53, to lock the end of the pull wire in place.

In the construction shown in Figs. 1 and 2, the two screws 58, which support the bracket 57, are two of a plurality of screws which connect the cover plate 61 of the carbureter to the body thereof.

A sheet metal link 63 may be mounted under the head of the swivel screw 53, the formed free end 64 of a coiled tension spring 65 being fitted into an opening formed in the opposite end of the link. The opposite end of the coiled tension spring 65 may be formed into a loop, or otherwise formed for convenient attachment to any suitable fixed point on the chassis of the vehicle, the tension in the spring returning the control lever 52 and the valve stem 50 to the open position, when the pull knob is released by the operator.

In this manner, the injection apparatus operates only while the engine is being started, the auxiliary fuel supply, through the injector tube, being automatically cut off after the engine is started, and the operator releases the control knob.

The construction of the insert flange 25, the outer contour thereof, and the size, location and spacing of the stud openings 66, may be altered to suit the requirements of the carbureter of the engine for which a particular installation is designed.

The location and size of the auxiliary openings 67, in the flange, may be made to conform to the requirements of the individual carbureter, or eliminated entirely, depending upon the design of the carbureter and the mounting flange thereof.

In installing the unit shown in Figs. 1, 2 and 3, on the conventional automobile, the fitting connecting the fuel line to the carbureter is removed, and replaced by the T 14, shown in Fig. 1, the adapter 17 being inserted between the fuel line coupling nut 18, and the T to reconnect the carbureter to the fuel lines.

The carbureter may be raised from the manifold, by removing the nuts mounted on the studs 28, after which the insert flange 25 is inserted between the carbureter and manifold flanges, gaskets 30 being inserted between the faces of the auxiliary flange and the carbureter and manifold flanges.

The bracket 57 may be attached to the carbureter by removing two or more of the cover screws 58, and reinserting them into the carbureter body after the bracket is in place.

The installation requires no special tools, equipment, or skill on the part of the mechanic making the installation, beyond that usually possessed by the ordinary mechanic engaged in this work.

Where the unit is installed in an engine or vehicle, at the time of manufacture, or where a replacement intake manifold, or the intake pipe section of the manifold is used, where the manifold is made in more than one piece, a modified construction shown in Fig. 7, may be utilized.

In this construction a replacement intake manifold 70, or the intake pipe section 71, of the manifold, may be substituted for the regular intake manifold, or a boss 72, welded, or otherwise attached to the intake manifold, with a threaded opening 73, formed in the center of the boss, in substantial alignment with the center of the manifold.

Where the outer wall of the manifold is heavy enough, the opening 73 may be formed directly in the manifold wall, and the boss eliminated.

An adapter 74, or other suitable support means, having an opening formed therein, into which a short, small-diameter injector tube 75 may be fitted, the injector tube being soldered, brazed, or otherwise attached to the adapter, may be threadably fitted to the opening 73, formed in the manifold boss.

An auxiliary fuel tube 76, slightly longer than the tube 23, shown in Figs. 1 and 2 may be inserted between the valve 20, and the adapter 74, the upper end of the tube being substantially the same as that shown in Figs. 1 and 3, and hereinbefore described, the lower end of the tube being gripped between a tube coupling nut 34, and the outer threaded portion of the adapter 74, thus directly connecting the valve to the injector tube 75.

The free end of the injector tube 75 would be sealed in the same manner as that shown in Fig. 3, a plurality of nozzle openings 45 being formed through the outer wall of the tube, in substantial alignment with the center of the manifold 70, as indicated in Figs. 4 and 7.

In this construction the insert flange 25 would be eliminated entirely, the carbureter and manifold flanges being connected by a plurality of studs, with a gasket 30 interposed between the flanges, in the conventional manner.

The operation of this type of unit is substantially the same as that shown in Figs. 1 and 3, and hereinbefore described, except that the fuel from the valve 20, after passing through the auxiliary tube 76, flows directly into the injector tube 75, through the opening in the adapter 74, the fuel being finely dispersed at the nozzle openings 45, formed in the end of the injector tube, the dispersed fuel particles mixing with the fuel-air stream, in the manifold, in the manner hereinbefore described.

Where a manifold 70 having a threaded opening 73, formed in one wall thereof, as shown in Fig. 7, is used, the installation is simpler than that of the unit shown in Figs. 1 and 3, in that it is unnecessary to disconnect the manifold from the carbureter, the adapter 74, with the injector tube attached thereto, being threaded into the opening 73, and the auxiliary fuel tube 76, attached to the outer section of the adapter by means of the coupling nut 34.

The valve 20, the valve control means, and the remote control mechanism, used with the construction shown in Fig. 7 are substantially the same as those shown in Figs. 1 and 2, and hereinbefore described.

In internal combustion engines having eight or more cylinders, or where the cylinders are mounted in separate banks, and are fed by a carbureter having a dual throat, two injector tubes 36 or 75, depending upon the type of installation used, may be provided, each tube fitting into the corresponding inlet pipe section of the dual manifold.

The bracket 57, which supports the pull wire shield would be designed or adapted to suit the mounting bolts and body contour of the individual carbureter.

All other parts of the apparatus would be suitable for universal application for all types of vehicles, the length of the pull wire being determined by the distance between the carbureter and the instrument panel of the vehicle.

The construction may be applied to internal combustion engines, used in marine, stationary, industrial, or other type of installation with equal facility as its adaptation to automobiles.

The construction shown in Fig. 7, would be utilized on vehicles equipped with new engines, or special manifolds, engines equipped with manifolds having outer walls heavy enough to support a threaded, or other suitable form of opening, or any engine fitted with a manifold, in which access may be obtained through the outer wall of the intake pipe section, the adapter 74, shown in Fig. 7, being replaced by any other suitable means for supporting the injector tube, and simultaneously connecting the injector tube to the auxiliary fuel tube.

It will be apparent to those skilled in the art that my present invention is not limited to the specific details described above and shown in the drawings, and that various further modifications are possible in carrying out the features of the invention without departing from the spirit and scope of the appended claims.

What I claim as new, and desire to secure by Letters Patent, is:

1. An auxiliary fuel injector for an internal combustion engine, fitted with a carbureter, a fuel line, and an intake manifold, comprising means connecting said fuel line to the carbureter, a valve connected to said connecting means, a flanged insert mounted between the carbureter and the intake manifold, an auxiliary fuel line interposed between the valve and the insert, tubular injection means attached to said flanged insert, said injection means projecting into the intake manifold, said injection means having a plurality of openings formed in the free end thereof, and manually controlled means for opening said valve, a portion of the fuel from said fuel line being sprayed into the intake manifold through the injector openings, when the valve is opened.

2. In a motor vehicle driven by an internal combustion engine, fitted with a carbureter, a fuel line, and an intake manifold, an auxiliary fuel injection apparatus, comprising a fitting connecting said fuel line to the carbureter, a valve connected to said fitting, a flanged insert mounted between the connecting flanges of the carbureter and intake manifold, an auxiliary fuel tube coupling the valve and the insert, a tubular injector attached to said flanged insert, said injector projecting into the intake manifold, means sealing the free end of said injector, said injector tube having a plurality of Venturi openings formed therein, adjacent the sealed end thereof, means manually controlling the opening of said valve, and means connecting said control means to another portion of said vehicle, a portion of the fuel from said fuel line being sprayed into the manifold through the Venturi openings when the valve is opened.

3. In a motor vehicle driven by an internal combustion engine, fitted with a carbureter and an intake manifold, an auxiliary fuel injection attachment, comprising a tubular fuel line adapted to feed liquid fuel from the source to the carbureter, a multiple-leg fitting connecting the fuel line to the fuel inlet of the carbureter, a valve connected to one leg of said fitting, a flanged insert interposed between the carbureter outlet and the intake manifold, means clamping the insert between the carbureter and the manifold, an auxiliary fuel tube interposed between the valve and the insert, a tubular injector attached to said insert, said insert having a plurality of openings formed therein, connecting the injector to the auxiliary fuel tube, said tubular injector projecting into the intake manifold, means sealing the free end of said injector tube, said tube having a plurality of openings formed therein, adjacent the sealed end thereof, means adapted to manually control the opening of said valve, means connecting said control means to the operating section of said vehicle, and means automatically closing said valve when the connecting means is released, a portion of the fuel from the fuel line being sprayed into the intake manifold, through the injector openings, when the valve is opened, to facilitate starting the engine.

4. In a motor vehicle driven by an internal combustion engine, fitted with a carbureter, a fuel line, and an intake manifold, an auxiliary fuel injection apparatus, comprising a fitting connecting the fuel line to the carbureter fuel inlet, a valve connected to one leg of said fitting, a flanged insert interposed between the outlet end of the carbureter and the intake manifold, an auxiliary tubular fuel line inserted between the valve and the insert, a tubular injector attached to the insert, said insert having a plurality of passages formed therein, connecting the fuel line with the injector tube, said tubular injector projecting into the inlet opening in the manifold, means sealing the free end of the injector tube, said tube having a plurality of openings formed therein, adjacent the sealed end thereof, and means adapted to manually control the opening of the valve, a portion of the fuel from the fuel line being sprayed into the intake manifold, through the injector openings, when the valve is opened, to facilitate starting the engine.

5. In a motor vehicle driven by an internal combustion engine, fitted with a carbureter, a fuel line, and an intake manifold, an auxiliary fuel injection apparatus, comprising a multiple-outlet fitting connecting the fuel line to the carbureter fuel inlet, a valve connected to one leg of said fitting, a flanged insert interposed between the outlet end of the carbureter and the intake manifold, an auxiliary tubular fuel line inserted between the valve and the insert, a tubular injector attached to the insert, said insert having a plurality of passages formed therein, connecting the fuel line with the injector tube, said tubular injector projecting into the inlet opening in the manifold, means sealing the free end of the injector tube, said tube having a plurality of openings formed therein, adjacent the sealed end thereof, and means closing said valve when the manual opening means is released, a portion of the fuel from the fuel line being sprayed into the intake manifold through the injector openings, when the valve is opened, to facilitate starting the engine.

6. In a motor vehicle driven by an internal combustion engine, fitted with a carbureter, a fuel line, and an intake manifold, an auxiliary fuel injection apparatus, comprising a multiple-outlet fitting connecting the fuel line to the carbureter fuel inlet, a valve connected to one leg of said fitting, a flanged insert clamped between the outlet end of the carbureter and the intake manifold, an auxiliary tubular fuel line interposed between the valve and the insert, a tubular injector attached to the insert, said insert having a plurality of passages formed therein, connecting the fuel line with the injector tube, said tubular injector projecting into the inlet opening in the manifold, means sealing the free end of the injector tube, said tube having a plurality of openings formed therein, adjacent the sealed end thereof, a lever attached to the stem of said valve, said lever being adapted to open the valve, flexible control means connected to the opposite end of said lever, said flexible control means being adapted to manually control the opening of said valve, and a spring attached to said lever, said spring closing the valve when the manual control means is released, a portion of the fuel from the fuel line being sprayed into the intake manifold through the injector openings, when the valve is opened, to facilitate starting the engine.

7. In a motor vehicle driven by an internal combustion engine, fitted with a carbureter, a fuel line, and an intake manifold, an auxiliary fuel injection apparatus, comprising a multiple-outlet fitting connecting the fuel line to the carbureter fuel inlet, a valve connected to one leg of said fitting, a flanged insert clamped between the outlet end of the carbureter and the intake manifold, an auxiliary fuel tube interposed between the valve and the insert, a tubular injector attached to the insert, said insert having a plurality of passages formed therein, connecting the fuel tube with the injector tube, said tubular injector projecting into the inlet opening in the manifold, means sealing the free end of the injector tube, said tube having a plurality of openings formed therein, adjacent the sealed end thereof, a lever attached to the stem of said valve, said lever being adapted to actuate the valve, flexible control means, adapted to manually control the opening of said valve, means pivotally connecting one end of said flexible control means to the free end of the lever, a tubular guard surrounding said flexible control means, a bracket clamping one end of said tubular guard, means attaching said bracket to the carbureter, and a tension spring attached to one end of said lever, said spring closing the valve when the manual control means is released, a portion of the fuel from the fuel line being sprayed into the intake manifold, through the injector openings, when the valve is opened, to facilitate starting the engine.

8. In a motor vehicle driven by an internal combustion engine, fitted with a carburetor, a fuel line, and an intake manifold, an auxiliary fuel injection apparatus, comprising a T connecting the fuel line to the carburetor fuel inlet, a valve connected to one leg of said T, a flanged insert clamped between the outlet end of the carburetor and the intake manifold, an auxiliary fuel tube interposed between the valve and the insert, a tubular injector attached to the insert, said insert having a plurality of passages formed therein, connecting the fuel line to the injector tube, said tubular injector projecting into the inlet opening in the manifold, means sealing the free end of the injector tube, said tube having a plurality of openings formed therein, adjacent the sealed end thereof, a lever attached to the stem of said valve, said lever being adapted to actuate the valve, a flexible control wire, adapted to manually control the opening of said valve, means pivotally connecting one end of said flexible control wire to the free end of the lever, a tubular guard surrounding said flexible control wire, a bracket clamping one end of said tubular guard, means attaching said bracket to the carburetor, and a tension spring attached to one end of said lever, said spring closing the valve when the manual control wire is released, a portion of the fuel from the fuel line being sprayed into the intake manifold, through the injector openings, when the valve is opened, to facilitate starting the engine.

9. An auxiliary fuel injector for an internal combustion engine, fitted with a carburetor, a fuel line, and an intake manifold, comprising a fitting connecting said fuel line to the carburetor fuel inlet, a valve connected to said fitting, said manifold having an opening formed through one wall thereof, an adapter threadably fitted to said opening, an auxiliary fuel tube interposed between the valve and the adapter, injection means, attached to said adapter, projecting into the intake manifold, said injection means having a plurality of openings formed in the free end thereof, and manually-controlled means for opening said valve, a portion of the fuel from the fuel line being sprayed into the intake manifold through the injector openings, when the valve is opened.

10. In a motor vehicle driven by an internal combustion engine, fitted with a carburetor, a fuel line, and an intake manifold, an auxiliary fuel injection apparatus, comprising a fitting connecting said fuel line to the carburetor, a valve connected to said fitting, a tubular injector, projecting into the intake manifold, means supporting said tubular injector within the manifold, an auxiliary fuel tube coupling the valve and the tubular injector, means sealing the free end of said injector tube, said injector tube having a plurality of Venturi openings formed therein, adjacent the sealed end thereof, means manually controlling the opening of said valve, and means connecting said control means to another portion of the vehicle, a portion of the fuel from said fuel line being sprayed into the intake manifold through the Venturi openings when the valve is opened, to facilitate starting the engine.

THOMAS C. LEAKE.

REFERENCES CITED

The following references are of record in the file of this patent:

UNITED STATES PATENTS

| Number | Name | Date |
|---|---|---|
| 1,370,801 | Elwell | Mar. 8, 1921 |
| 1,704,832 | Higgins | Mar. 12, 1929 |

FOREIGN PATENTS

| Number | Country | Date |
|---|---|---|
| 25,088 | Great Britain | of 1910 |
| 3,205 | Great Britain | of 1913 |